United States Patent
Tang et al.

(10) Patent No.: US 11,196,677 B2
(45) Date of Patent: Dec. 7, 2021

(54) HETEROGENEOUS MULTI-PROTOCOL STACK METHOD, APPARATUS, AND SYSTEM

(71) Applicant: HUAWEI TECHNOLOGIES CO., LTD., Guangdong (CN)

(72) Inventors: Lingling Tang, Shenzhen (CN); Kai Zheng, Beijing (CN); Rujie Chen, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/453,988

(22) Filed: Jun. 26, 2019

(65) Prior Publication Data
US 2019/0319894 A1 Oct. 17, 2019

Related U.S. Application Data

(63) Continuation of application No. PCT/CN2017/116605, filed on Dec. 15, 2017.

(30) Foreign Application Priority Data

Dec. 30, 2016 (CN) .......................... 201611261640.3

(51) Int. Cl.
*H04L 29/06* (2006.01)
*H04L 12/927* (2013.01)
(Continued)

(52) U.S. Cl.
CPC ...... *H04L 47/6215* (2013.01); *H04L 41/5003* (2013.01); *H04L 47/805* (2013.01)

(58) Field of Classification Search
CPC ........ G06F 9/5027; G06F 9/4881; G06F 8/45; H04L 47/805; H04L 69/30
(Continued)

(56) References Cited

U.S. PATENT DOCUMENTS 10,284,488 B1* 5/2019 Gemignani, Jr. ....... H04L 47/78
2002/0068565 A1* 6/2002 Purnadi ............ H04W 36/0033
455/436
(Continued)

FOREIGN PATENT DOCUMENTS

CN 101529407 A 9/2009
CN 102595509 A 7/2012
(Continued)

OTHER PUBLICATIONS

Jean-Franqois Huard et al. A programmable transport architecture with QoS guarantees, IEEE Communications Magazine ( vol. 36 , Issue: 10 , Oct. 1998). pp. 54-62. XP000785911.

*Primary Examiner* — Syed Ali
*Assistant Examiner* — Jason A Harley
(74) *Attorney, Agent, or Firm* — Womble Bond Dickinson (US) LLP

(57) ABSTRACT

A heterogeneous multi-protocol stack system including a plurality of heterogeneous protocol stack instances is described. Resource allocation between the protocol stack instances is unbalanced, and algorithms are independently configured, so that QoS capacities of different protocol stack instances are different. Data packets of applications or connections with different QoS requirements can be dispatched by a dispatcher to corresponding protocol stack instances at a high speed. When system resources are limited, the heterogeneous multi-protocol stack system is capable of simultaneously supporting classification optimization processing performed on data of a high-concurrency application, a high-throughput application, and a low-delay application, so as to meet QoS requirements of different types of applications, thereby improving user experience.

18 Claims, 15 Drawing Sheets

(51) Int. Cl.
*H04L 29/12* (2006.01)
*H04W 48/16* (2009.01)
*H04L 12/863* (2013.01)
*H04L 12/24* (2006.01)

(58) Field of Classification Search
USPC .................................................. 718/104
See application file for complete search history.

(56) References Cited

U.S. PATENT DOCUMENTS

| | | | | |
|---|---|---|---|---|
| 2002/0145924 | A1* | 10/2002 | Beckwith | G06F 9/465 |
| | | | | 365/200 |
| 2006/0070054 | A1* | 3/2006 | Naik | G06F 8/656 |
| | | | | 717/165 |
| 2007/0005725 | A1 | 1/2007 | Morris | |
| 2010/0281489 | A1* | 11/2010 | Lee | G06F 9/50 |
| | | | | 718/106 |
| 2010/0291942 | A1 | 11/2010 | Piipponen et al. | |
| 2014/0359632 | A1* | 12/2014 | Kishan | G06F 9/4881 |
| | | | | 718/103 |
| 2016/0077872 | A1 | 3/2016 | Gu et al. | |
| 2016/0239337 | A1 | 8/2016 | Gu et al. | |
| 2016/0308921 | A1 | 10/2016 | Tsym | |
| 2016/0337483 | A1 | 11/2016 | Yang et al. | |
| 2018/0020084 | A1 | 1/2018 | Solis et al. | |
| 2018/0042009 | A1* | 2/2018 | Abdel Shahid | H04W 72/121 |
| 2019/0042767 | A1* | 2/2019 | Whitmer | G06F 16/951 |

FOREIGN PATENT DOCUMENTS

| | | |
|---|---|---|
| CN | 102710497 A | 10/2012 |
| CN | 103533065 A | 1/2014 |
| CN | 104142867 A | 11/2014 |
| CN | 104580124 A | 4/2015 |
| CN | 104811431 A | 7/2015 |
| CN | 105992290 A | 10/2016 |
| EP | 1613003 A1 | 1/2006 |
| EP | 3043260 A1 | 7/2016 |

* cited by examiner

HETEROGENEOUS MULTI-PROTOCOL STACK METHOD, APPARATUS, AND SYSTEM

CROSS-REFERENCE TO RELATED APPLICATIONS

This application is a continuation of International Application No. PCT/CN2017/116605, filed on Dec. 15, 2017, which claims priority to Chinese Patent Application No. 201611261640.3 filed on Dec. 30, 2016. The disclosures of the aforementioned applications are hereby incorporated by reference in their entireties.

TECHNICAL FIELD

This disclosure relates to the field of communications technologies, and in particular, to a data transfer acceleration method and a related apparatus and system.

BACKGROUND

A protocol stack is an important component implementing communication between devices, and ensures that reliable end-to-end transmission can be performed on user data in a complex network environment. As shown in FIG. 1, a server receives a data packet by using a network interface card (NIC) and adds the received data packet into a receiving queue. Data packets in the receiving queue are successively transferred to a protocol stack for processing. Finally, the protocol stack submits processed data packets to an upper-layer application. In addition, after being processed by the protocol stack, data generated by the application is sent by using the network interface card.

With development of Internet technologies, a quantity of applications and types of the applications are increasing, for example, a video application, a social media application, and an e-commerce application. Different types of applications have different characteristics, for example, quality of service (QoS) requirements may be different significantly. For example, requirements on indicators, for example, a concurrent connection quantity, a data throughput, and a transmission delay/jitter, are different. In a high-concurrency application, a large quantity of socket resources are required to support a large quantity of concurrent connections, but only a relatively small quantity of data buffer resources are required. In a high-throughput application, a large quantity of data buffer resources are required to buffer a large amount of data, but a relatively small quantity of socket resources are required.

A prior protocol stack usually caters to a general service scenario, and when system resources are limited, it is difficult to simultaneously meet different data processing requirements of different types of applications.

SUMMARY

Embodiments of the present invention provide a data processing method, a server, and a terminal, so that resources of protocol stacks can be properly allocated based on characteristics of different types of applications, thereby improving processing efficiency and resource utilization of the protocol stacks.

According to a first aspect, an embodiment of the present invention provides a server, including a manager, a first protocol stack instance, a second protocol stack instance, and at least one dispatcher, where the manager is configured to allocate resources to the first protocol stack instance and the second protocol stack instance, a resource configuration of the first protocol stack instance is different from that of the second protocol stack instance, and the resource configuration indicates a type of an allocated resource and a quota of each type of resource; the first protocol stack instance is configured to process a data packet of a first-type application, and the second protocol stack instance is configured to process a data packet of a second-type application; and the dispatcher is configured to: receive a data packet, determine, based on characteristic information of the data packet, a protocol stack instance that matches the data packet, determine the matched protocol stack instance from the first protocol stack instance and the second protocol stack instance, and dispatch the data packet to the matched protocol stack instance. In the foregoing server, the manager configures resources of protocol stack instances in an unbalanced manner, so that different protocol stack instances have different resource configurations, thereby meeting different data processing requirements of different types of applications. In addition, the dispatcher dispatches a data packet to a protocol stack instance that matches an application to which the data packet belongs for processing, so that corresponding optimization processing is performed on data packets of different types of applications, and system resources are also fully used. Therefore, when resources are limited, the different data processing requirements of different types of applications are simultaneously met.

In a possible embodiment, the resource configuration of the first protocol stack instance meets a QoS requirement of the first-type application, and the resource configuration of the second protocol stack instance meets a QoS requirement of the second-type application; and the dispatcher is specifically configured to: dispatch the data packet to the first protocol stack instance if it is determined, based on the characteristic information of the data packet, that the data packet belongs to the first-type application, or dispatch the data packet to the second protocol stack instance if it is determined, based on the characteristic information of the data packet, that the data packet belongs to the second-type application. In this way, for resource requirement characteristics of different types of applications, resources are allocated to the first protocol stack instance and the second protocol stack instance in an unbalanced manner, so as to meet QoS requirements of different types of applications. The dispatcher can quickly determine, by parsing the characteristic information of the data packet, an application to which the data packet belongs, and then dispatches the data packet to a matched protocol stack instance at a high speed, so as to improve data packet dispatching efficiency.

In a possible embodiment, the server further includes a rule repository, and the rule repository stores a dispatching rule that is used to indicate a dispatching policy of the data packet; and the dispatcher is specifically configured to determine, based on the characteristic information of the data packet and the dispatching rule, the protocol stack instance that matches the data packet.

In a possible embodiment, the dispatching rule includes a mapping relationship between a port number and/or an IP address and a protocol stack instance; and the dispatcher is specifically configured to: parse a header of the data packet to determine a port number and/or an IP address of the data packet, and determine, based on the determined port number and/or IP address and the mapping relationship that is indicated by the dispatching rule, the protocol stack instance that matches the data packet.

In a possible embodiment, the manager is specifically configured to: calculate a quota of each type of resource of the first protocol stack instance in the resource type and that of the second protocol stack instance in the resource type based on resource weights of the first protocol stack instance and the second protocol stack instance and a total quantity of available resources; and allocate, based on the calculated resource quotas, a corresponding quantity of socket resources, data buffer resources, and CPU resources to each of the first protocol stack instance and the second protocol stack instance, where quotas of socket resources allocated to the first protocol stack instance, the second protocol stack instance, and a third protocol stack instance are not exactly the same; and/or quotas of data buffer resources allocated to the first protocol stack instance, the second protocol stack instance, and the third protocol stack instance are not exactly the same; and/or quotas of CPU resources allocated to the first protocol stack instance, the second protocol stack instance, and the third protocol stack instance are not exactly the same.

In a possible embodiment, the server further includes a coordinator, configured to: dynamically adjust the resource configurations of the first protocol stack instance and the second protocol stack instance based on resource utilization and/or load statuses of the first protocol stack instance and the second protocol stack instance in a running process. For example, a type of resource is increased for a protocol stack instance, or a type of resource is decreased for a protocol stack instance, so that resources of the protocol stack instance are scalable. In this way, the protocol stack instance can fully use allocated resources.

In a possible embodiment, the server includes a plurality of dispatchers, and each dispatcher is associated with at least one of the first protocol stack instance and the second protocol stack instance and is configured to dispatch a received data packet to a protocol stack instance associated with the dispatcher.

In a possible embodiment, the dispatcher of the server and the protocol stack instance communicate with each other through memory sharing, so that data can be dispatched efficiently.

In a possible embodiment, the type of application includes at least one of a high-concurrency application, a high-throughput application, and a low-delay application, and the first-type application and the second-type application are not exactly the same. To be specific, the first-type application may belong to a plurality of application types at the same time and the second-type application may also belong to a plurality of application types at the same time, but the first-type application and the second-type application do not belong to exactly the same applications types.

According to a second aspect, an embodiment of the present invention provides a terminal. The terminal has functions of implementing the manager, the protocol stack instance, and the coordinator in the foregoing method examples. The functions may be implemented by hardware, or may be implemented by hardware by executing corresponding software. The hardware or the software includes one or more modules corresponding to the foregoing functions.

In a possible embodiment, the terminal includes an application processor, a storage, and a communications subsystem. The communications subsystem is configured to receive a signal and convert the signal into a data packet in a specific format, and the application processor runs a protocol stack program in the storage, to execute the functions of the manager, the protocol stack instance, and the coordinator in the foregoing examples.

In another possible embodiment, a structure of the terminal includes a receiving unit, a processing unit, and a sending unit. These units may execute corresponding functions in the foregoing method examples. For details, refer to detailed descriptions in the method examples, and details are not repeatedly described.

According to a third aspect, an embodiment of the present invention provides a data processing method. The method includes steps performed by the manager, the protocol stack instance, and the coordinator in the foregoing examples.

According to another aspect, an embodiment of the present invention provides a computer storage media, configured to store a computer software instruction used by the foregoing server or terminal. The computer software instruction includes functions of implementing the manager, the protocol stack instance, and the coordinator that are described in the foregoing aspects.

In any one of the foregoing aspects or any possible embodiment of any one of the foregoing aspects, the characteristic information of the data packet includes one or more of a source IP address, a source port, a destination IP address, a destination port, a uniform resource locator (URL), and a protocol name.

In any one of the foregoing aspects or any possible embodiment of any one of the foregoing aspects, the resource type includes a socket resource, a data buffer resource, and a CPU resource.

In any one of the foregoing aspects or any possible embodiment of any one of the foregoing aspects, the application types include a high-concurrency application, a high-throughput application, and a low-delay application. Alternatively, the application types include a first-priority application and a second-priority application.

In any one of the foregoing aspects or any possible embodiment of any one of the foregoing aspects, the application types are classified based on at least one of a QoS requirement, a priority, a user quantity, a data flow amount, and a used protocol of an application.

Compared with the prior art, the embodiments of the present invention provide a heterogeneous multi-protocol stack system. The manager configures resources of different types of protocol stack instances in an unbalanced manner, so that the different protocol stack instances have different resource configurations, thereby adapting to characteristics of different types of applications. In addition, the dispatcher dispatches a data packet to a protocol stack instance that matches an application to which the data packet belongs for processing, so that corresponding optimization processing is performed on data packets of different types of applications, and system resources are also fully used. Therefore, when resources are limited, different processing requirements of different types of applications are simultaneously met as far as possible.

BRIEF DESCRIPTION OF DRAWINGS

To describe the technical solutions in the embodiments of the present invention or in the prior art more clearly, the following briefly describes the accompanying drawings required for describing the embodiments or the prior art.

DESCRIPTION OF EMBODIMENTS

The following describes the embodiments of the present invention with reference to the accompanying drawings. Apparently, the described embodiments are merely some rather than all of the embodiments of the present invention. A person of ordinary skill in the art may understand that with evolution of network architectures and emergence of new application scenarios, the technical solutions provided in the embodiments of the present invention are also applicable to similar technical problems.

Figure 1:
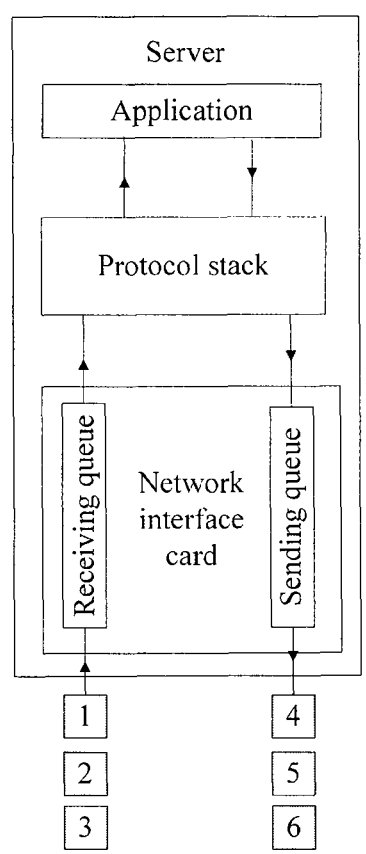
FIG. 1 is a schematic diagram of a protocol stack.
Figure 2:
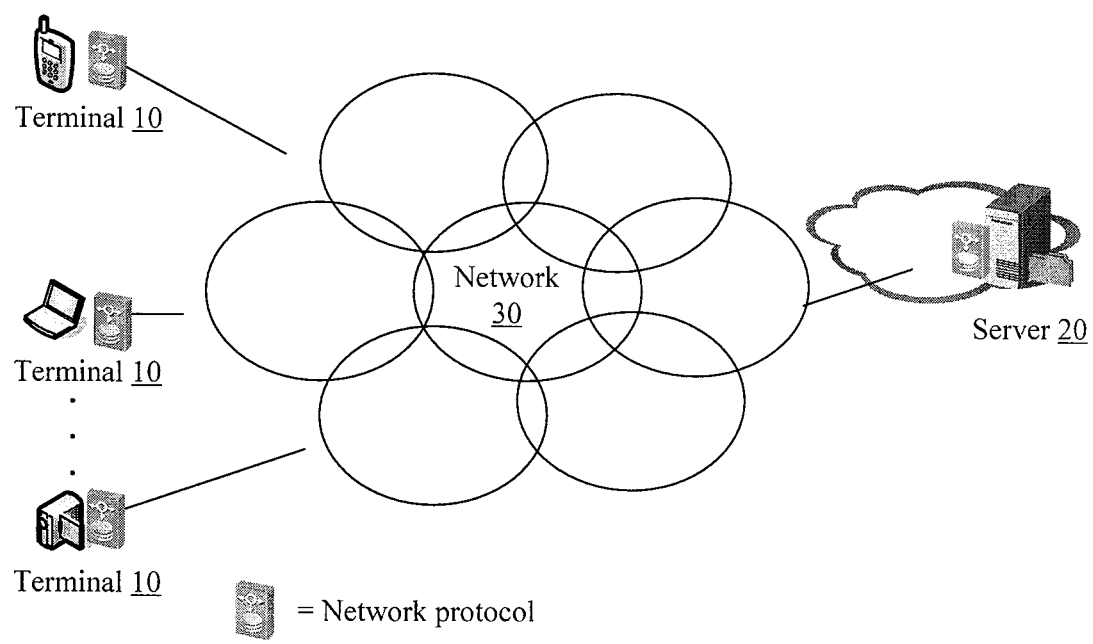
FIG. 2 is a schematic diagram of a communications system according to an embodiment of the present invention.

The solutions of the embodiments of the present invention may be typically applied to a communications system shown in FIG. 2. According to FIG. 2, the communications system includes a terminal 10, a server 20, and a network 30. The terminal 10 is connected to the network 30 by using an access device such as a wireless local area network (WLAN) access point or a cellular network access point, and establishes a connection with the server 20 based on a specific network protocol. The server 20 transmits data such as a video stream to the terminal 10 based on a request of the terminal 10 by using the established connection.

The terminal is a device providing voice and/or data connectivity for a user, and includes a wireless terminal or a wired terminal. The wireless terminal may be a handheld device having a wireless connection function, or another processing device connected to a wireless modem. For example, the wireless terminal may be a mobile phone (or referred to as a "cellular" phone) or a computer provided with a mobile terminal. For another example, the wireless terminal may alternatively be a portable, pocket-sized, handheld, computer built-in, or in-vehicle mobile apparatus. For still another example, the wireless terminal may be a portion of a mobile station or user equipment (UE). A term "data packet" in this specification, the claims, and the accompanying drawings of the present invention is a basic unit of network transmission and is data organized in a specific format. Different types of network protocols have different definitions about a format of a data packet. However, generally, one data packet may be divided into a header and a payload. The header includes information that is necessary in a transmission process of the data packet, for example, address information and a flag bit, and the payload is also referred to as a data part and includes content of sent data.

The network 30 may include a part of a public network, a private network, and the Internet, and/or any combination thereof. For brevity, another part of the network 30 is not described.

The server 20 may be an application server, a server agent, a data center server, or a gateway. A person skilled in the art may understand that one communications system may usually include components more or less than those shown in FIG. 2. FIG. 2 shows components more related to implementations disclosed in the embodiments of the present invention. For example, although three terminals 10 and one server 20 are shown in FIG. 2, a person skilled in the art may understand that one communications system may include any quantity of terminals and servers.

Figure 3:
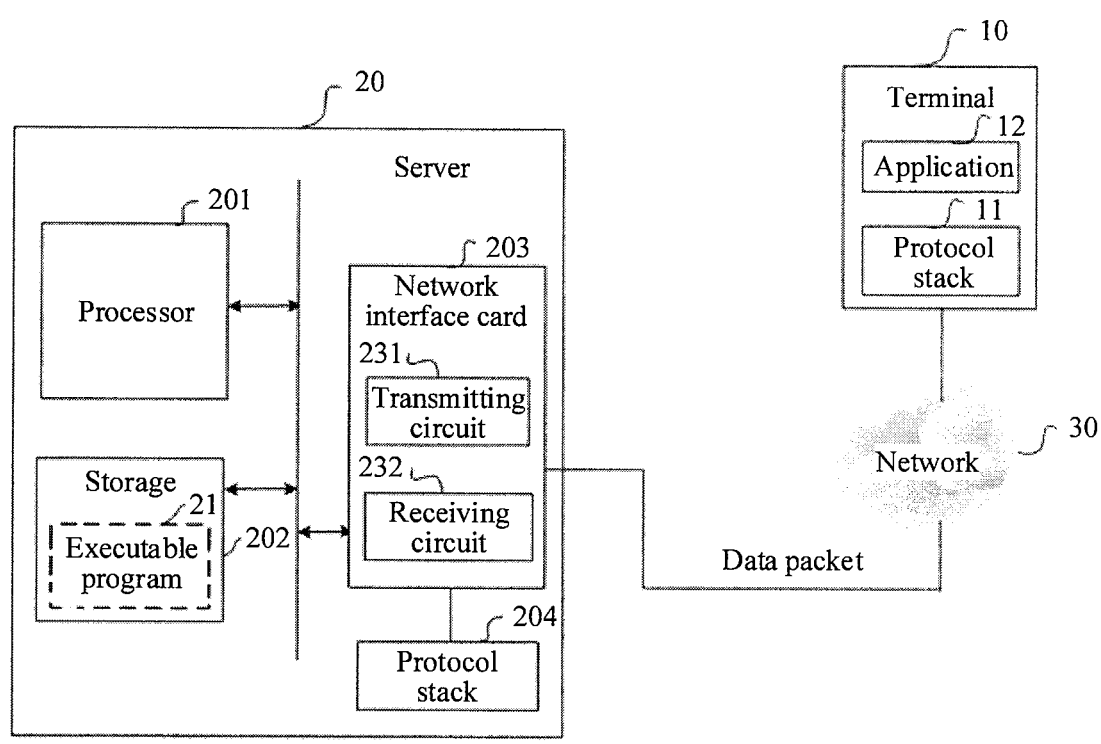
FIG. 3 is a structural composition diagram of a server according to an embodiment of the present invention.

FIG. 3 shows main components of a server 20 according to an embodiment of the present invention. In FIG. 3, the server 20 includes a processor 201, a storage 202, and a network interface card (NIC) 203. The network interface card 203 includes a transmitting circuit 231 and a receiving circuit 232. The storage 202 stores an executable program 21, and the executable program 21 includes an operating system and an application. The processor 201 may run the executable program 21 in the storage 202, to implement a specific function. To establish a communications connection between the server 20 and a terminal 10 and transmit a data packet based on the established connection, a plurality of network protocols are used. These protocols are combined into a protocol suite based on layers, and a component that implements a protocol suite function is referred to as a protocol stack. As shown in FIG. 3, the server 20 and the terminal 10 each include a protocol stack 204 and a protocol stack 11. After being processed by the protocol stack 204, a data packet is sent to the terminal 10 by using the transmitting circuit 231 of the network interface card 203. The receiving circuit 232 receives a data packet of an application 12 running on the terminal 10, and transfers the data packet to the protocol stack 204 for processing. The protocol stack may be implemented by using a proper combination of software, hardware, and/or firmware. In one embodiment, the protocol stack 204 and the protocol stack 11 are transmission control protocol/Internet protocol (TCP/IP) protocol stacks. The TCP/IP protocol stack is a protocol stack implemented by referring to a protocol suite defined in a TCP/IP reference model. The protocol suit includes two core protocols: the transmission control protocol (TCP) and the Internet protocol (IP), and as defined by the TCP/IP reference model, protocols included in the protocol suite are classified into five abstract "layers": a physical layer, a link layer, a network layer, a transport layer, and an application layer. Definitions about the layers all belong to the prior art and are not described in the embodiments of the present invention. A person skilled in the art may understand that the protocol stack in the embodiments of the present invention is not limited to the TCP/IP protocol stack, and other types of protocol stacks such as an OSI protocol stack are all applicable to a method in the embodiments of the present invention.

In addition, a person skilled in the art may understand that the server 20 may include components more or less than those shown in FIG. 3. FIG. 3 merely shows components more related to a plurality of implementations disclosed in the embodiments of the present invention.

Figure 4:
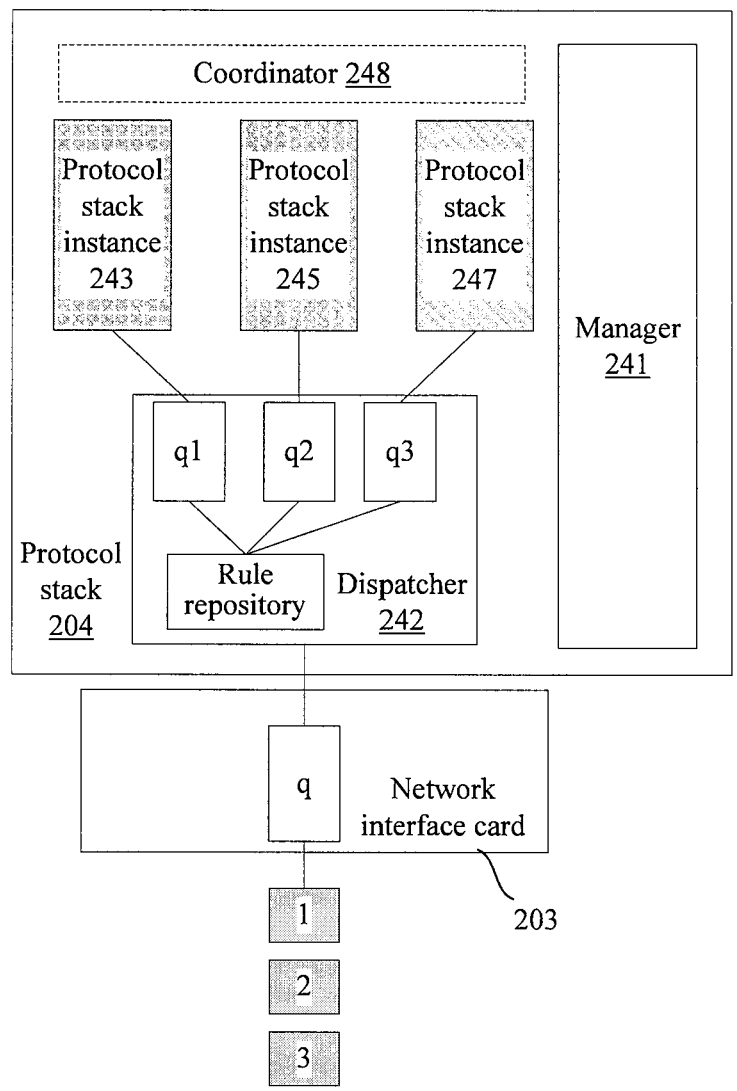
FIG. 4 is a schematic diagram of a protocol stack according to an embodiment of the present invention.

In one embodiment, as shown in FIG. 4, a protocol stack 204 includes a heterogeneous protocol stack manager (manager for short) 241, a dispatcher 242, and a plurality of heterogeneous protocol stack instances. In FIG. 4, protocol stack instances 243, 245, and 247 are used as examples for description. It can be understood that the protocol stack 204 may include any quantity of protocol stack instances.

The manager 241 is configured to allocate resources to the protocol stack instances, and create a dispatching rule of a data packet by configuring a rule repository of the dispatcher 242.

Figure 5:
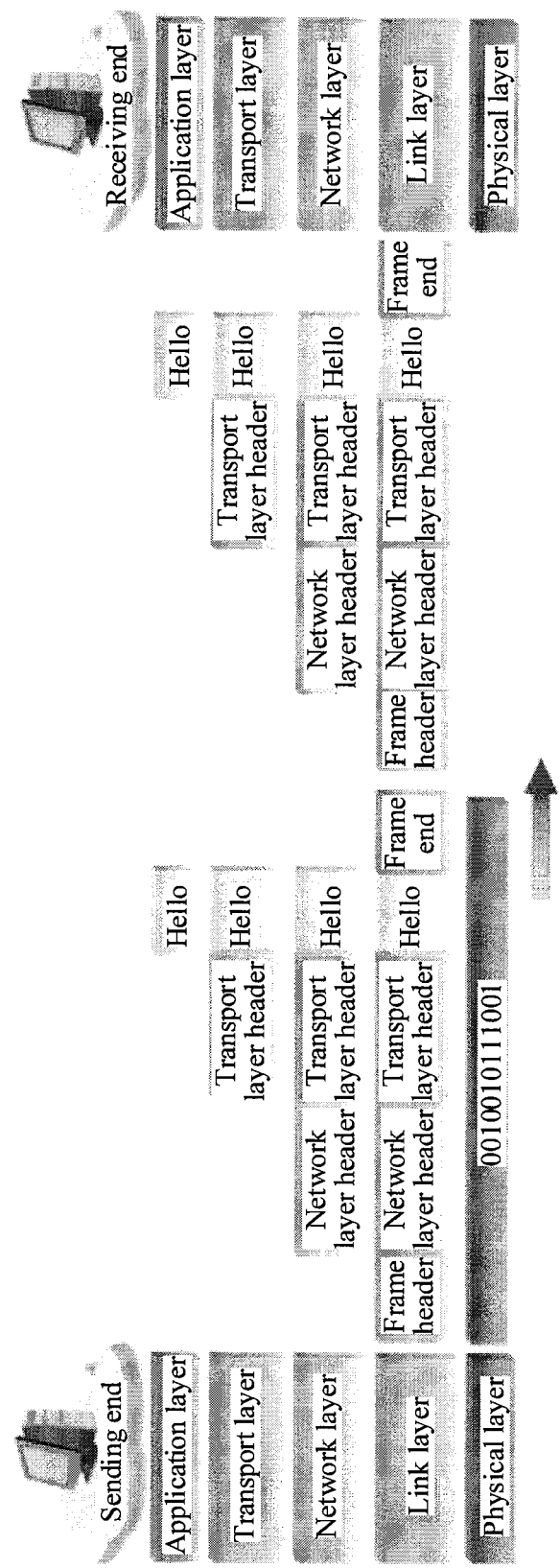
FIG. 5 is an operation principle diagram of a protocol stack instance according to an embodiment of the present invention.

The protocol stack instances are responsible for processing a data packet dispatched by the dispatcher 242, and the data packet is a data packet received from outside by a network interface card or a data packet generated by an application. One protocol stack instance may be one or more threads, may be one or more processes, or may be a combination of any quantity of threads and processes. Processing performed by the protocol stack instance on a data packet mainly includes an encapsulation operation and a decapsulation operation. As shown in FIG. 5, if the protocol stack 204 is a TCP/IP protocol stack, for a downlink data packet (a data packet sent by an external device to the network interface card), the protocol stack instance adds a header and/or a frame end to the data packet based on each layer protocol specification of the TCP/IP protocol; and for an uplink data packet (a data packet generated by an application and to be sent to an external device), the protocol stack instance removes a header and/or a frame end from the data packet based on each layer protocol specification.

The protocol stack instances 243, 245, and 247 are heterogeneous, in other words, different protocol stack instances have different resource configurations. The term "resource" in the embodiments of the present invention refers to a software/hardware resource required for processing a data packet, and includes but is not limited to a resource such as a CPU, a data buffer (buffer), and a socket. The resource configuration may indicate a resource type and quantity, or a proportion of different types of resources. In one embodiment, three types of applications may be defined based on QoS requirements of the applications: a high-concurrency application, a high-throughput application, and a low-delay application. Based on data transmission characteristics of the high-concurrency application, the high-throughput application, and the low-delay application, the manager 241 allocates resources to a plurality of protocol stack instances in an unbalanced manner, so as to meet the QoS requirements of the different types of applications. For example, a relatively large quantity of socket resources are allocated to the protocol stack instance 243, to support a large quantity of concurrent connections, thereby meeting a QoS requirement of the high-concurrency application; a relatively large quantity of data buffer resources are allocated to the protocol stack instance 245, to meet a QoS requirement of the high-throughput application; and a relatively large quantity of CPU resources are allocated to the protocol stack instance 247, to meet a QoS requirement of the low-delay application (in FIG. 4, different types of protocol stack instances are identified in different filling manners). The embodiments of the present invention are not limited to defining an application type based on a QoS requirement of an application, and any quantity of application types may also be defined based on characteristics in another aspect of the applications, for example, a priority, a user quantity, a data flow amount, and a used protocol. Correspondingly, the manager 241 configures the plurality of heterogeneous protocol stack instances based on the application types. One protocol stack instance is configured to process data of one specific type of application, and a resource allocated to the protocol stack instance meets a QoS requirement of the specific type of application.

The dispatcher 242 is configured to dispatch, based on a type of an application to which a data packet belongs, the data packet to a protocol stack instance corresponding to the type of the application to which the data packet belongs, so as to process the data packet. Specifically, in one embodiment, the dispatcher 242 configures one of receiving queues q1, q2, and q3 to each protocol stack instance, and adds, based on the dispatching rule, the data packet received by the network interface card 203 into one of q1, q2, and q3.

In the protocol stack described in the foregoing embodiment, the manager configures resources of the protocol stack instances in an unbalanced manner, so that different protocol stack instances have different resource configurations, thereby meeting QoS requirements of different types of applications. In addition, the dispatcher dispatches a data packet to a protocol stack instance that matches an application to which the data packet belongs for processing, so that corresponding optimization processing is performed on data packets of different types of applications, and system resources are also fully used. Therefore, when resources are limited, QoS requirements of various types of applications are met.

Figure 6:
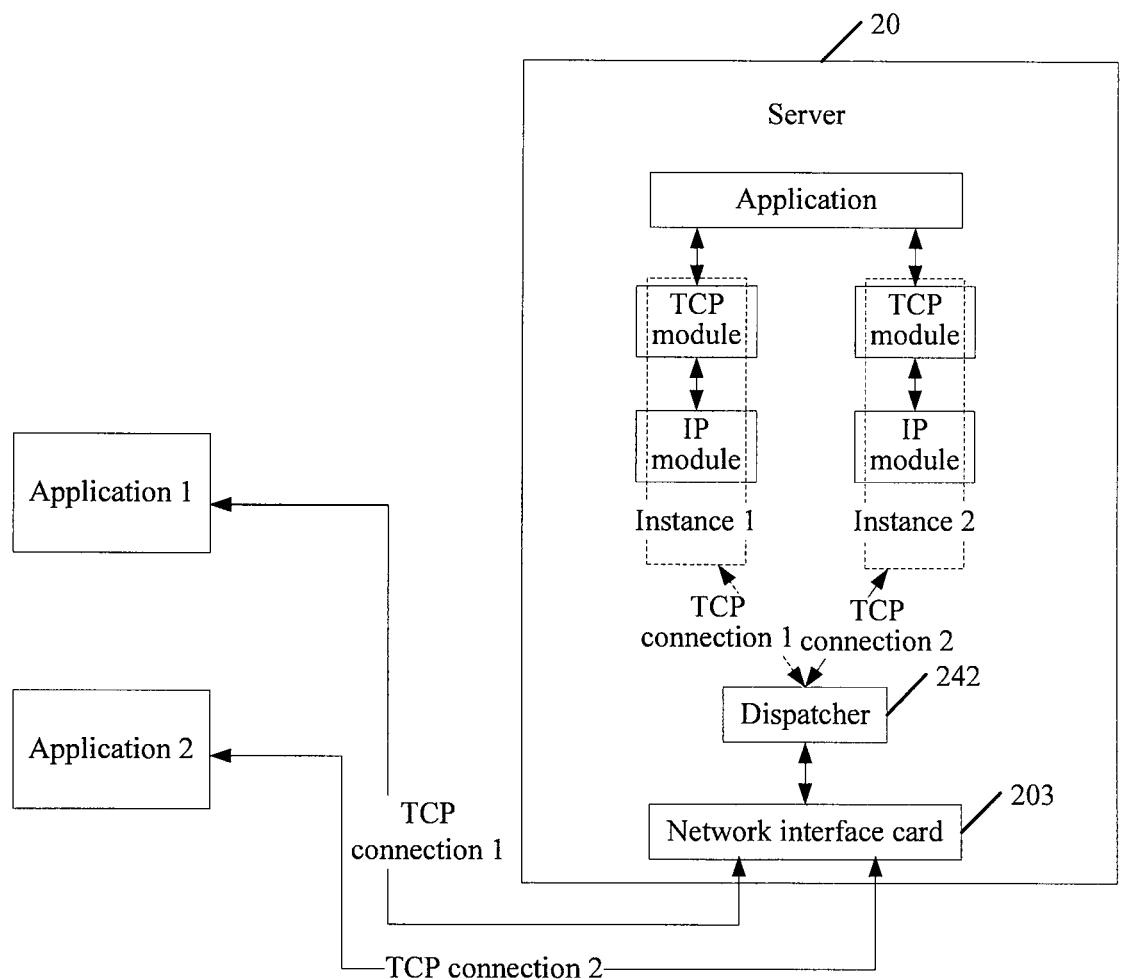
FIG. 6 is a schematic diagram of a process of processing a data packet by a protocol stack according to an embodiment of the present invention.
Figure 7:
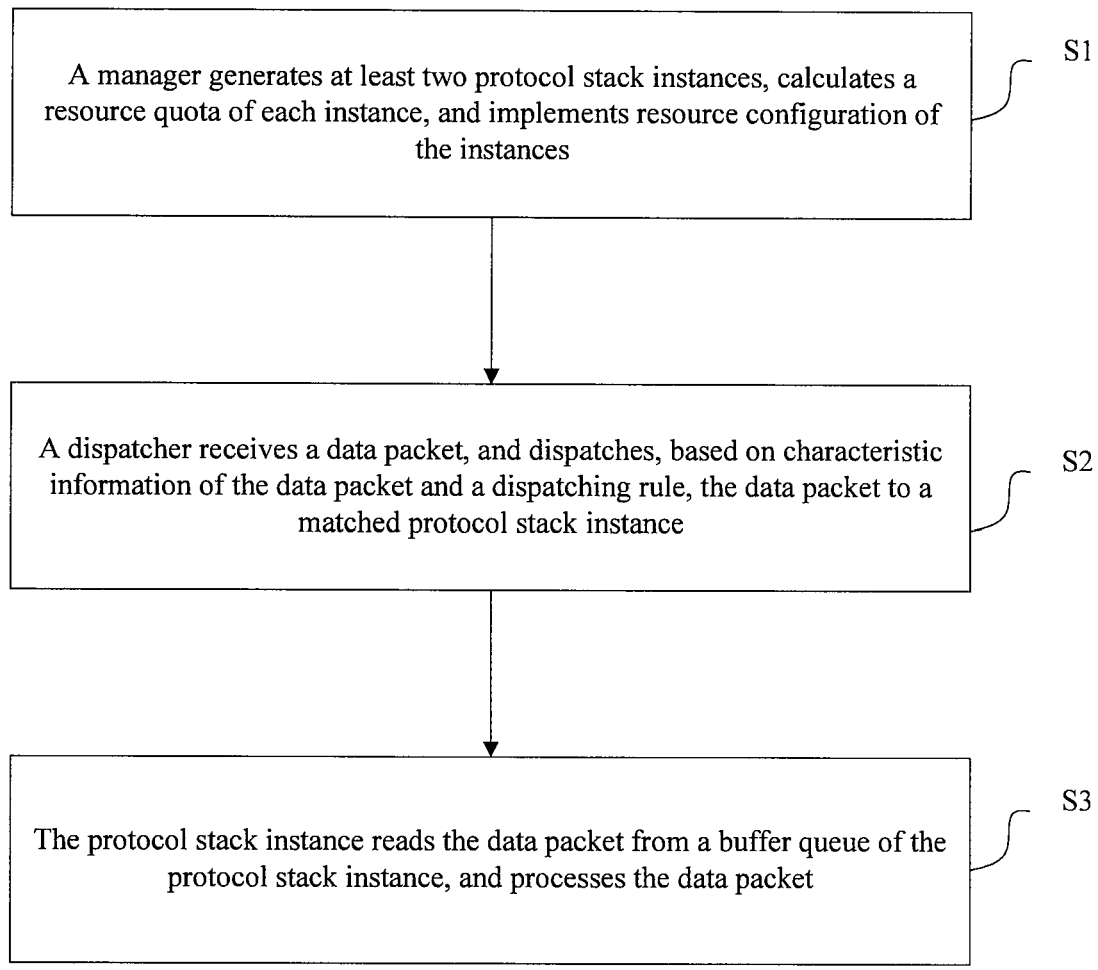
FIG. 7 is an operation flowchart of a protocol stack according to an embodiment of the present invention.
Figure 8:
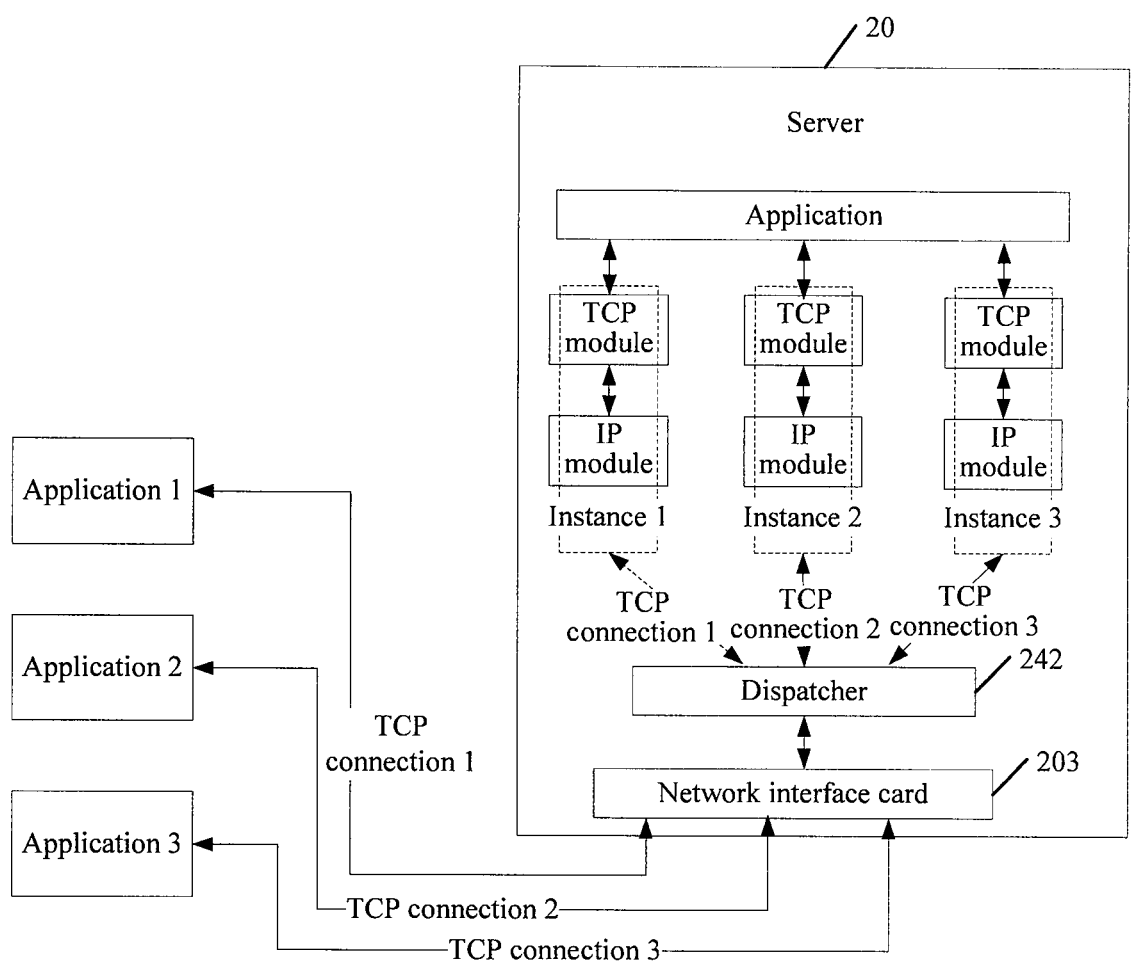
FIG. 8 is a schematic diagram of a process of processing a data packet by a protocol stack according to an embodiment of the present invention.

With reference to FIG. 6 to FIG. 8, the following describes a process of processing a data packet by a protocol stack 204.

As shown in FIG. 6, an application 1 and an application 2 respectively establish a TCP connection 1 and a TCP connection 2 to an application 21 on a server 20. The application 1 and the application 2 are implemented by applications running on a same terminal or on different terminals. A main operation process of the protocol stack 204 of the server 20 is shown in FIG. 7.

S1. A manager generates two TCP/IP protocol stack instances (an instance 1 and an instance 2 shown in FIG. 6), determines a resource configuration of each of the instance 1 and the instance 2 based on QoS requirements of the application 1 and the application 2, and implements allocation of various types of resources between the instance 1 and the instance 2 based on the foregoing information, so that the resource configuration of the instance 1 meets the QoS requirement of the application 1, and the resource configuration of the instance 2 meets the QoS requirement of the application 2. The resource configuration herein includes a resource type and a quota of each type of resource. The quota resource refers to a quantity of resources, and a resource quota unit is one minimum allocatable unit. Then, the manager 241 establishes a mapping relationship between an application and an instance or a mapping relationship between a TCP connection and an instance by configuring a dispatching rule that is in a rule repository of a dispatcher 242.

S2. The dispatcher receives a data packet sent by a network interface card, parses characteristic information (such as 5-tuple information) of the data packet, determines classification of the data packet (such as a TCP connection in which the data packet resides or an application to which the data packet belongs) based on the characteristic information, and dispatches the data packet to a corresponding instance based on the dispatching rule configured in the rule repository. In this way, a data packet on the TCP connection 1 is dispatched to the instance 1, and a data packet on the TCP connection 2 is dispatched to the instance 2.

S3. The instance 1 and the instance 2 respectively process data packets of the application 1 and the application 2. Specifically, each instance includes a TCP module and an IP module that are respectively configured to encapsulate/decapsulate a TCP header and an IP header. Data processed by the TCP module is finally submitted to the application 1 or the application 2.

It should be noted that a process of processing a downlink data packet by the protocol stack 204 is described above, and a processing process of an uplink data packet (application) is similar. A main difference of the two processing processes is as follows: A protocol stack instance performs a decapsulation operation on the downlink data packet but performs an encapsulation operation on the uplink data packet; in addition, after being processed by the protocol stack instance, the uplink data packet is sent to an external device by using the network interface card.

Similarly, FIG. 8 shows a process of processing data packets of three types of applications by a server 20. Assuming that an application 1 is a high-concurrency application, an application 2 is a high-throughput application, and an application 3 is a low-delay application, a manager 241 may allocate, based on resource requirement characteristics of the high-concurrency application, the high-throughput application, and the low-delay application, resources to instances 1, 2, and 3 in an unbalanced manner, so as to meet QoS requirements of different types of applications. For example, more socket resources are allocated to the instance 1, to support a large quantity of concurrent connections, thereby meeting a QoS requirement of the high-concurrency application 1; more data buffer resources are allocated to the instance 2, to meet a QoS requirement of the high-throughput application 2; and more CPU resources are allocated to the instance 3, to meet a QoS requirement of the low-delay application 3. A dispatcher 242 then respectively dispatches data packets on TCP connections 1, 2, and 3 to the instances 1, 2, and 3 based on characteristic information of the data packets. Therefore, classified optimization processing of the high-concurrency application, the high-throughput application, and the low-delay application can be supported simultaneously, so that user application experience is improved.

With reference to accompanying drawings, the following further describes implementation details for embodiments of the manager 241 and the dispatcher 242.

The manager 241 runs on an independent process or thread, and implements the following operations.

Figure 9:
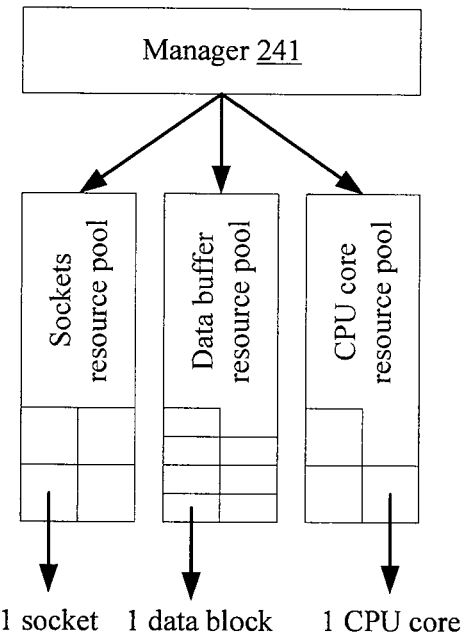
FIG. 9 is a schematic diagram of a process of creating a resource pool by a manager according to an embodiment of the present invention.

(1) Create a socket resource pool, a data buffer resource pool, and a CPU resource pool. The CPU resource pool includes allocatable CPU cores, the data buffer resource pool includes available buffer space, and the socket resource pool includes available sockets. As shown in FIG. 9, in one embodiment, a minimum allocatable unit of the socket resource pool is one socket, a minimum allocatable unit of the data buffer resource pool is one buffer block of a fixed size, for example, a buffer block of 1024 bytes, a buffer block of 1500 bytes, or a buffer block of another size, and a minimum allocatable unit of the CPU resource pool is one CPU core.

Figure 10:
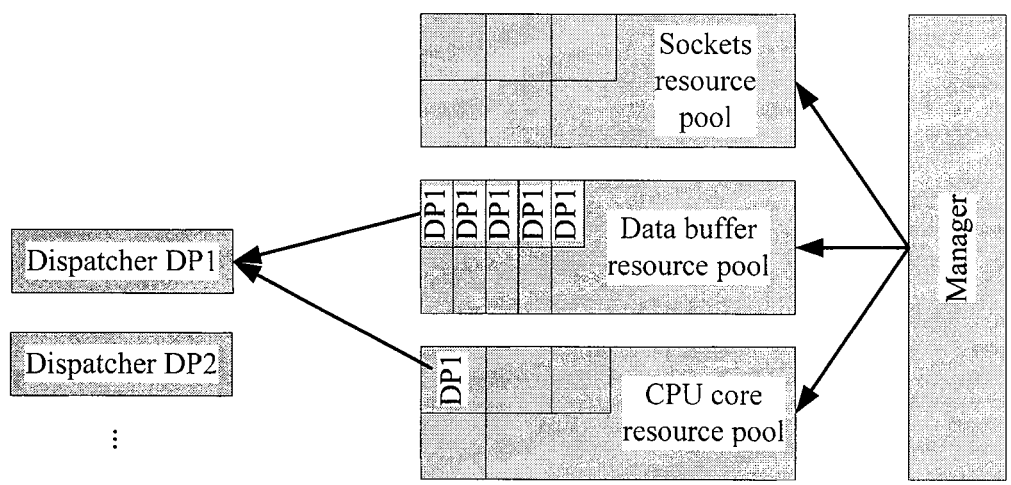
FIG. 10 is a schematic diagram of a process of creating a dispatcher by a manager according to an embodiment of the present invention.

(2) Create the dispatcher. In one embodiment, as shown in FIG. 10, a manager reads configuration data, and creates a dispatcher: the manager first obtains an available dispatcher DP1 from a dispatcher resource pool, then allocates $N_{DP1}$ data buffer blocks from the data buffer resource pool to the DP1, and finally selects one available CPU core from the CPU resource pool and binds the CPU core with the DP1. When there are a plurality of dispatchers (for example, the DP1 and a DP2 shown in FIG. 10), each time a dispatcher is created, the foregoing steps are repeated once; and each dispatcher runs on one independent process or thread.

(3) Create a protocol stack instance. In one embodiment, the manager creates a plurality of different types of protocol stack instances based on defined application types. For example, if two types of applications, namely a high-concurrency application and a high-throughput application, are defined, the manager may create two types of protocol stack instances: a high-concurrency protocol stack instance and a high-throughput protocol stack instance. The high-concurrency protocol stack instance is configured to process data of the high-concurrency application, and the high-throughput protocol stack instance is configured to process data of the high-throughput application. No limitation is imposed on a quantity of protocol stack instances of each type; in other words, there may be a plurality of protocol stack instances of a same type. Each protocol stack instance runs on one independent process or thread.

A socket resource is associated only with a protocol stack instance, a data buffer resource and a CPU resource may be associated not only with a protocol stack instance but also with a dispatcher, but one resource can be associated only with one instance at a same time.

The following further describes a process of creating a protocol stack instance. Processes of creating different types of protocol stack instances are approximately the same, but differ slightly in detail. The following uses creation of a high-concurrency protocol stack instance and a high-throughput protocol stack instance as an example for description. The manager obtains available protocol stack instances X1 and Y1 from a protocol stack instance resource pool, and respectively sets types thereof as a high-concurrency type X and a high-throughput type Y. In one embodiment, for the high-concurrency protocol stack instance, a socket resource weight is set to $W_{Mx}=3$, a data buffer resource weight is set to $W_{Nx}=1$, and a CPU resource weight is set to $W_{Lx}=1$; and for a high-throughput protocol stack instance, a socket resource weight is set to $W_{My}=1$, a data buffer resource weight is set to $W_{Ny}=3$, and a CPU resource weight is set to $W_{Ly}=2$. Then, based on types and quantities of protocol stack instances, and resource weights of different types of protocol stack instances, quotas of various types of resources of the protocol stack instances are calculated. For example, for the high-concurrency protocol stack instance X1 and the high-throughput protocol stack instance Y1, a socket resource quota Mx of X1 meets the following formula:

$$M_X = \left(\frac{W_{Mx}}{W_{Mx} + W_{My}}\right)M \qquad \text{(Formula 1)}$$

A socket resource quota My of Y1 meets the following formula:

$$M_y = \left(\frac{W_{My}}{W_{Mx} + W_{My}}\right) M \qquad \text{(Formula 2)}$$

M represents a total quantity of available sockets in the socket resource pool. Correspondingly, a quota of another type of resource may also be dynamically determined by using a similar algorithm based on a resource weight value.

In another embodiment, resource quotas of various types of protocol stack instances may alternatively be statically configured. An administrator pre-configures resources quotas of various types of protocol stack instances by using a configuration file, a configuration command, or a visual graphical interface. For example, a socket resource quota of a high-concurrency protocol stack instance is configured as Q1, a data buffer resource quota of the high-concurrency protocol stack instance is configured as Q2, and a CPU resource quota of the high-concurrency protocol stack instance is configured as Q3; a socket resource quota of a high-throughput protocol stack instance is configured as S1, a data buffer resource quota of the high-throughput protocol stack instance is configured as S2, and a CPU resource quota of the high-throughput protocol stack instance is configured as S3; and a socket resource quota of a low-delay protocol stack instance is configured as T1, a data buffer resource quota of the low-delay protocol stack instance is configured as T2, and a CPU resource quota of the low-delay protocol stack instance is configured as T3, so that the quotas respectively meet QoS requirements of a high-concurrency application, a high-throughput application, and a low-delay application. Specific values of Q1 to Q3, S1 to S3, and T1 to T3 may be set by the administrator based on experience or a test result. Usually, when resources are limited, resource quotas of different types of protocol stack instances are not exactly the same, so that requirements of different types of applications are better met. For example, the socket resource quota of the high-concurrency protocol stack instance is greater than those of the high-throughput protocol stack instance and the low-delay protocol stack instance, so that more sockets support a large quantity of concurrent connections; the data buffer resource quota of the high-throughput protocol stack instance is greater than those of the high-concurrency protocol stack instance and the low-delay protocol stack instance, so as to meet a buffer requirement of a large amount of data; and the CPU resource quota of the low-delay protocol stack instance is greater than those of the high-concurrency protocol stack instance and the high-throughput protocol stack instance, so as to ensure real-time data processing.

The manager associates each protocol stack instance with a corresponding quantity of socket resources, data buffer resources, and CPU resources based on the determined resource quotas of the protocol stack instances.

Optionally, in one embodiment, the manager may further configure different algorithm combinations for different types of protocol stack instances, to optimize data processing of different applications. For example, for the high-concurrency protocol stack instance, a high-concurrency TCP algorithm module is constructed from an algorithm library. This includes but is not limited to the following steps:

(a) disable a Nagle algorithm module;
(b) disable a delay Ack algorithm module;
(c) enable a TIME-WAIT sockets fast-recovery and reuse algorithm module; and
(d) enable a high-concurrency keep-alive timer algorithm module.

For the high-throughput protocol stack instance Y1, a high-throughput TCP algorithm module is constructed from the algorithm library. This includes but is not limited to the following steps:

(a) enable a Nagle algorithm module;
(b) enable a delay Ack algorithm module;
(c) enable a TCP extended send window/extended receive window configuration algorithm module; and
(d) enable a TCP data packet batch processing algorithm module.

Figure 11:
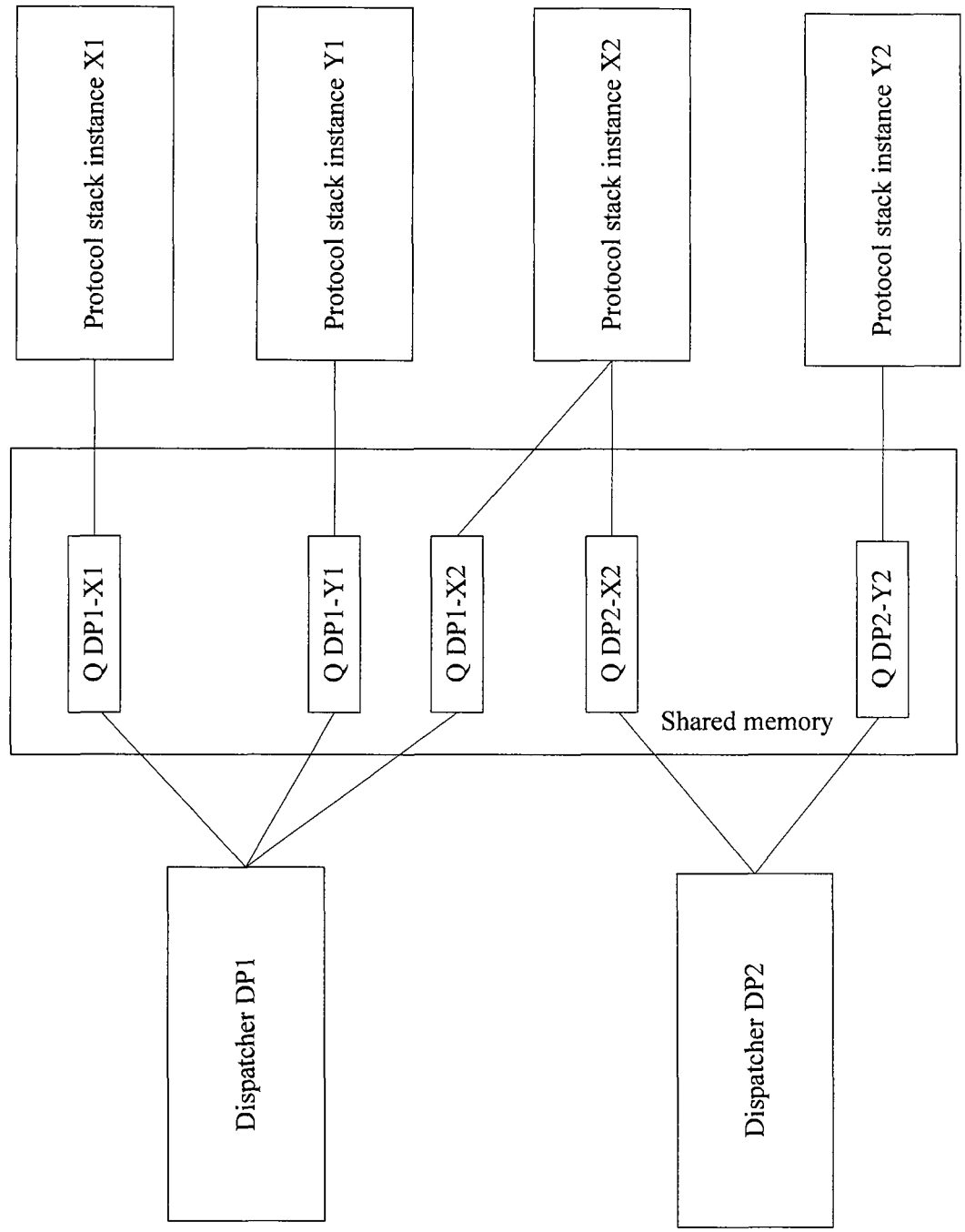
FIG. 11 is a schematic diagram of a communication mechanism between a coordinator and a protocol stack instance according to an embodiment of the present invention.

Further, after the protocol stack instances and the dispatcher are created, the manager binds the protocol stack instances with the dispatcher. In one embodiment, n protocol stack instances may be bound with one dispatcher, and n≥1. In another embodiment, to increase a data dispatching speed, one protocol stack instance may alternatively be bound with a plurality of dispatchers at the same time. As shown in FIG. 11, a protocol stack instance X2 is bound with dispatchers DP1 and DP2 at the same time.

In one embodiment, data transmission between the dispatcher and the protocol stack instance is implemented through memory sharing. Several buffer queues are configured in a shared memory, and each buffer queue is used to transmit data between one pair of dispatcher and protocol stack instance. For example, as shown in FIG. 11, a buffer queue between DP1 and X1 is marked as $Q_{DP1\text{-}X1}$, a buffer queue between DP1 and Y1 is marked as $Q_{DP1\text{-}Y1}$, and so on. The dispatchers DP1 and DP2 dispatch data packets received by a network interface card to the buffer queues in the shared memory based on a dispatching rule, and protocol stack instances X1, X2, Y1, and Y2 respectively read data packets that are in buffer queues corresponding to the protocol stack instances X1, X2, Y1, and Y2, for processing. In another embodiment, data transmission between the dispatcher and the protocol stack instance may be alternatively performed in another inter-process/inter-thread communication mechanism.

In one embodiment, a dispatcher 242 dispatches, based on a dispatching rule configured in a rule repository and characteristic information of a data packet, the data packet to a protocol stack instance that matches a QoS requirement of an application to which the data packet belongs or a connection in which the data packet resides. The characteristic information of the data packet includes but is not limited to one or more of a source IP address, a source port, a destination IP address, a destination port, a uniform resource locator (URL), and a protocol name. The characteristic information may be obtained by parsing the data packet. The IP address and the port information may be obtained by parsing a header of the data packet, and the protocol name, especially an application layer protocol name, probably needs to be obtained by detecting a payload of the data packet by using a deep packet inspection (DPI) technology.

Which characteristic information of the data packet specifically needs to be obtained by parsing by the dispatcher 242 depends on the dispatching rule defined in the rule repository. In one embodiment, a relatively simple dispatching rule may be defined. For example, a data packet whose port number and/or IP address meet/meets a first condition is dispatched to a protocol stack instance 243, and a data packet whose port number and/or IP address meet/meets a second condition is dispatched to a protocol stack instance 245. In this case, the dispatching rule actually includes a mapping relationship between a port number and/or an IP address and a protocol stack instance. By parsing the port number and/or the IP address of the data packet and matching the port number and/or the IP address with the dispatching rule, the dispatcher 242 may determine a protocol stack instance that matches the data packet, and further dispatch the data packet to a buffer queue of the matched protocol stack instance.

In another embodiment, the dispatching rule may also include a mapping relationship between a protocol name and a protocol stack instance. For example, an Hypertext Transfer Protocol (HTTP) data packet is corresponding to the protocol stack instance 243, an Real Time Streaming Protocol (RTSP) data packet is corresponding to the protocol stack instance 245. In this way, the dispatcher 242 can determine, by parsing a protocol name of a data packet, a protocol stack instance that matches the data packet, and further dispatch the data packet to the matched protocol stack instance.

In another embodiment, the dispatching rule may also include a mapping relationship between an application name and a protocol stack instance or a mapping relationship between an application type and a protocol stack instance. By parsing a received data packet, the dispatcher 242 determines a name or a type of an application to which the data packet belongs, and further dispatch the data packet to a corresponding protocol stack instance based on the foregoing mapping relationship.

It should be noted that the protocol name of the data packet, and the name and the type of the application to which the data packet belongs may usually be determined by parsing header content of a header of the data packet. If it is difficult to determine, by parsing the header content, the protocol name of the data packet, and the name and the type of the application to which the data packet belongs, the determining may be further performed by parsing application layer (L7) information of the data packet by using an existing DPI technology. In addition, all data packets transmitted on a same connection belong to a same application, use a same protocol, and have a same IP address and a same port number; therefore, if a protocol name or an application name of one data packet (such as a first packet) on one connection is identified, and a protocol stack instance that matches the protocol name or the application name of the data packet is determined, the dispatcher may establish a mapping relationship between the connection (usually identified by using the IP address and the port number) and the protocol stack instance. In this way, after the dispatcher subsequently receives a data packet, if the dispatcher determines, based on an IP address and a port number of the data packet, that the data packet belongs to the connection, the dispatcher may quickly forward the data packet to the protocol stack instance corresponding to the connection.

In another embodiment, the dispatching rule may alternatively be more complex. To be specific, a plurality of conditions may be included, for example, the dispatching rule may be defined by referring to a port number, an IP address, and a protocol name at a same time. For another example, if there are a plurality of protocol stack instances of a same type, the dispatching rule may further include a load balance policy. In this way, if the dispatcher determines, based on the dispatching rule, that a protocol stack instance that matches a currently received data packet is a first-type protocol stack instance, but there are a plurality of first-type protocol stack instances, the dispatcher may dispatch, based on the load balance policy, the data packet to one protocol stack instance whose load is relatively small in the plurality of first-type protocol stack instances. It can be understood that, a simpler dispatching rule indicates that the dispatcher needs to obtain less characteristic information by parsing and the data packet is dispatched faster, but dispatching accuracy is lower. A more complex dispatching rule indicates that the data packet is dispatched more precisely but processing of the dispatcher is more complex.

Optionally, as shown in FIG. 4, in one embodiment, the protocol stack 204 further includes a coordinator 248, configured to: monitor resource utilization of each protocol stack instance during running of the protocol stack instance, and dynamically adjust a resource configuration of the protocol stack instance based on the resource utilization of the protocol stack instance. For example, a type of resource is increased for a protocol stack instance, or a type of resource is decreased for a protocol stack instance, so that resources of the protocol stack instances are scalable. The coordinator monitors a changing status of a system available resource during running of the protocol stack instances, and dynamically adjusts a resource quota of each protocol stack instance based on a load changing status of the protocol stack instance, so that resources on the protocol stack instances can be fully used.

The coordinator 248 may specifically monitor the resource utilization of each protocol stack instance in real time, or periodically, or by triggering an event.

Figure 12:
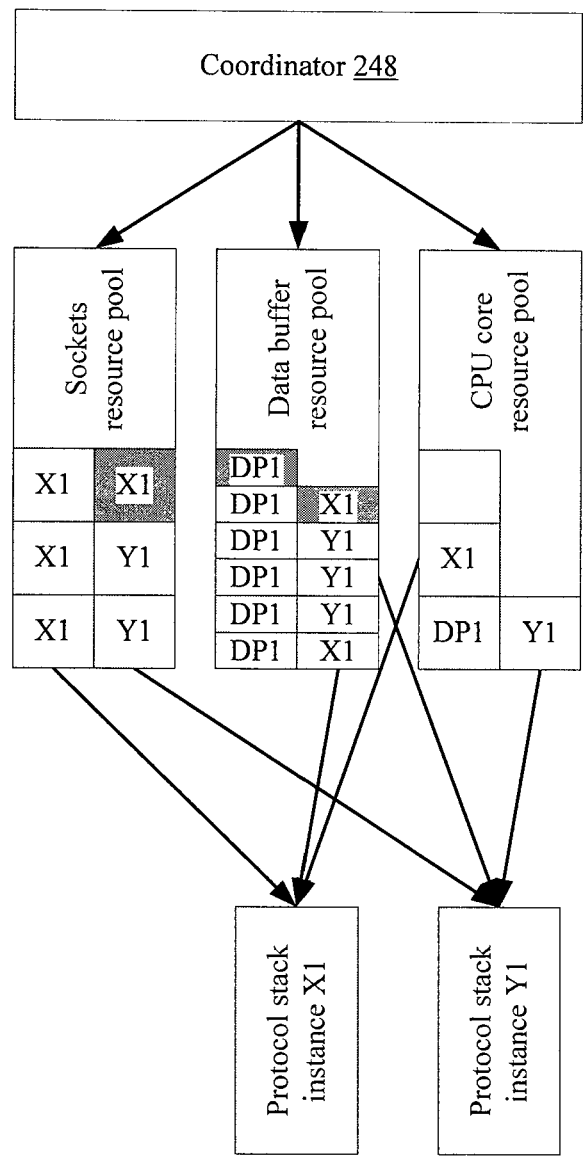
FIG. 12 is a schematic diagram of dynamically adjusting a resource configuration by a coordinator according to an embodiment of the present invention.

In one embodiment, the coordinator 248 calculates quota increasing or decreasing quantities of different types of resources based on the resource utilization of the protocol stack instances and weights of various types of resources of the protocol stack instance. For example, as shown in FIG. 12, currently, there are two protocol stack instances: X1 and Y1. Using a socket resource as an example, a quota increasing or decreasing quantity of the socket resource is calculated as follows:

$$\Delta M_X = \left(\frac{W_{Mx}}{W_{Mx} + W_{My}}\right)(M - M_{x\_used} - M_{y\_used}) - [M_X - M_{x\_used}] \quad \text{(Formula 3)}$$

$W_{Mx}$ represents a socket resource weight of the protocol stack instance X1, $W_{My}$ represents a socket resource weight of the protocol stack instance Y1, M represents a total quantity of available sockets in a socket resource pool, Mx is an initial socket resource quota of X1, and $M_{x\_used}$ and $M_{y\_used}$ respectively represent socket resources that have been currently used by the protocol stack instances X1 and Y1. For another type of resource, a calculation manner is similar. Further, the coordinator performs resource coordination based on quota increasing or decreasing quantities of the resources.

If $\Delta M_X=0$, the coordinator skips performing a resource coordination operation.

If $\Delta M_X>0$, the coordinator performs a socket resource increasing operation, to provide an increase of a quantity $\Delta M_X$ of socket resources for the protocol stack instance X1, as shown in FIG. 12.

If $\Delta M_X<0$, the coordinator performs a socket resource deleting operation, to withdraw a quantity $\Delta M_X$ of socket resources of the protocol stack instance X1.

Further, in one embodiment, the coordinator 248 may further monitor resource utilization of the dispatcher, and dynamically adjust a resource configuration of the dispatcher based on a monitoring result.

In one embodiment, the resource coordination operation performed by the coordinator 248 based on the quota increasing or decreasing quantities of the resources may be implemented by the manager. The coordinator 248 only needs to send calculated quota increasing or decreasing quantities of the resources of the instances to the manager, and the manager implements a resource increasing or deleting operation. Further, in another embodiment, the foregoing described resource quota calculation function of the manager during creating of a protocol stack instance may be implemented by the coordinator. After calculating resource quotas of various types of protocol stack instances, the coordinator sends the resource quotas to the manager, and then the manager implements resource configuration.

In another embodiment, all functions of the coordinator 248 may be integrated into the manager 241. To be specific, the manager 241 implements all functions of calculating, allocating, and dynamically adjusting a resource quota, so as to reduce overheads of communication between components.

The foregoing embodiments describe the specific operation principle and process of the protocol stack 204 of the server 20. The following describes an apparatus configured to implement the foregoing functions of the protocol stack.

Figure 13:
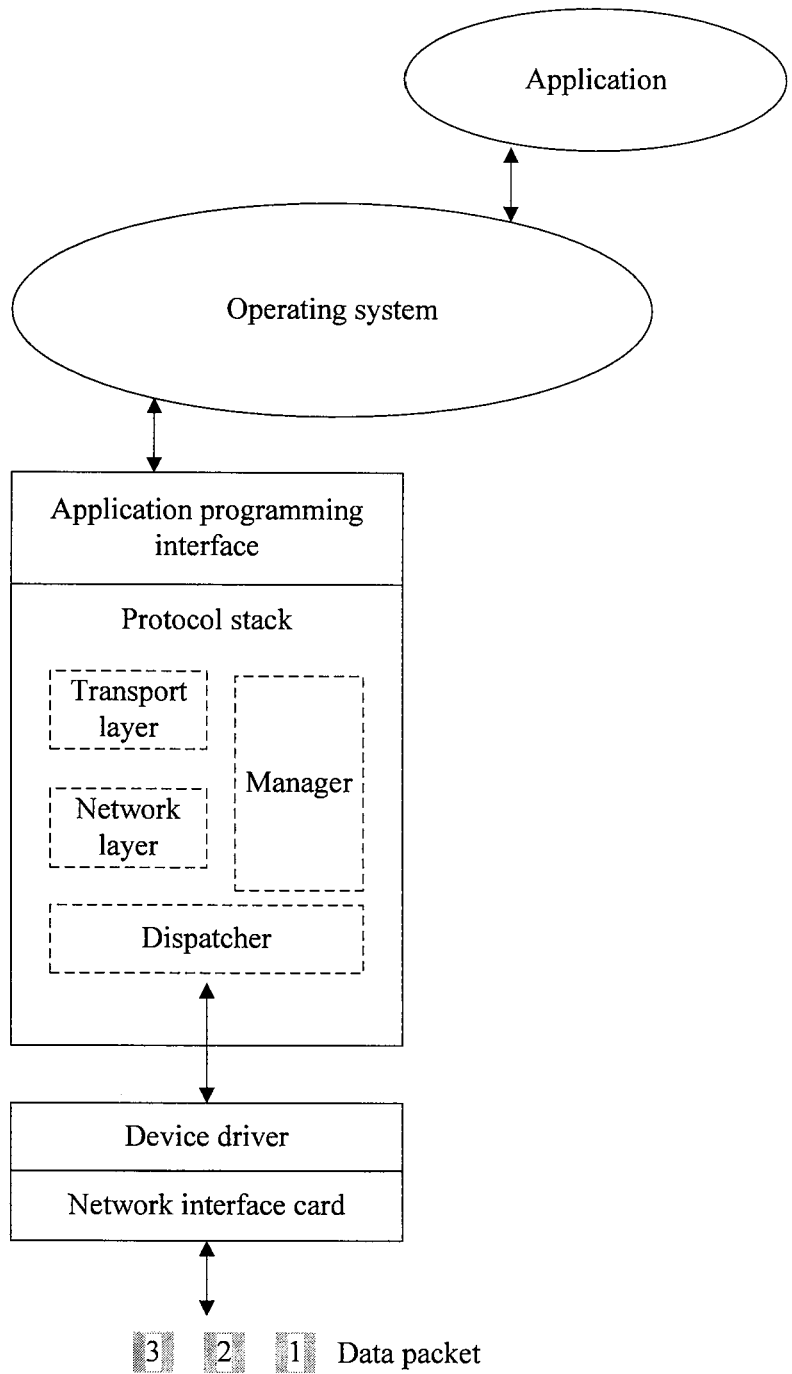
FIG. 13 is a schematic diagram of a protocol stack implemented by software according to an embodiment of the present invention.

In one embodiment, the protocol stack 204 of the server 20 shown in FIG. 3 is stored in the storage 202 of the server 20 in a form of an executable program. The processor 201 encodes the executable program corresponding to the protocol stack 204 into a machine instruction and executes the machine instruction, so as to execute the operation processes described in the foregoing embodiments. The processor 201 includes at least one of a general purpose processor, a microprocessor, a graphics processing unit, and a baseband processor. Specifically, as shown in FIG. 13, the executable program 21 stored in the storage 202 includes a device driver, a protocol stack, an interface, an operating system, and an application. The protocol stack may be further divided into a plurality of modules based on a protocol layer level or a function, and each module implements a function of one layer of protocol, for example, a network layer module is configured to implement a network layer protocol (such as the IP protocol), and a transport layer module is configured to implement a transport layer protocol (such as the TCP protocol or the UDP protocol). When a data packet arrives at a network interface card, a driver of the network interface card adds the data packet into a buffer queue of the protocol stack, and provides a notification to the operating system. The operating system invokes the modules of the protocol stack by using a system invoking interface, to execute the operation processes of the manager, the dispatcher, the protocol stack instance, and the coordinator described in the embodiments relating to FIG. 4 to FIG. 12. After being processed by the protocol stack, the data packet is finally submitted to an upper layer application.

In another embodiment, the protocol stack 204 may be implemented by a hardware circuit or an application-specific chip such as a field programmable gate array (FPGA) or an application-specific integrated circuit (ASIC). In this case, the processor 201 and the hardware circuit or the application-specific chip configured to implement the protocol stack 204 are connected by using a bus. The processor invokes the hardware circuit or the application-specific chip configured to implement the protocol stack 204, to process a data packet received by the network interface card.

The protocol stack described in the foregoing embodiments of the present invention is not necessarily applied to a server, and may be further applied to a terminal. The terminal may perform differentiated processing on data packets of different types of applications by implementing the protocol stack described in the foregoing embodiments, so as to meet QoS requirements of the different types of applications and improve user experience. For example, data of a video application may be dispatched to a high-throughput protocol stack instance for processing, and a data packet of an instant-message application may be dispatched to a low-delay protocol stack instance for processing.

Figure 14:
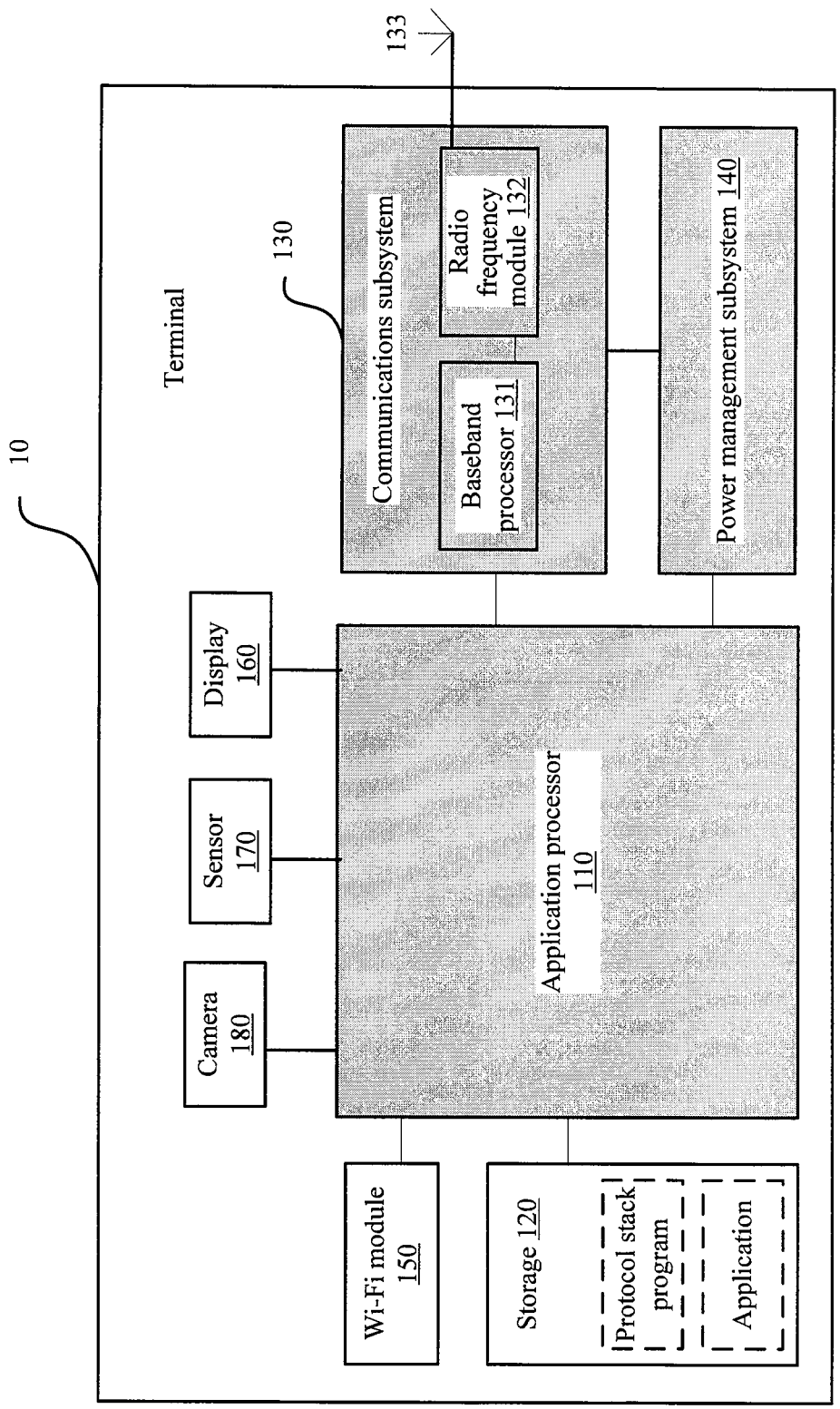
FIG. 14 is a schematic structural diagram of a terminal according to an embodiment of the present invention.

Specifically, as shown in FIG. 14, an embodiment of the present invention provides a terminal 10, including an application processor 110, a storage 120, a communications subsystem 130, and a power management subsystem 140. The storage 120 stores an executable program, and the executable program includes a protocol stack program and an application. The application may include any type of application such as a web browser, a video player, or an instant message application. The power management subsystem 140 is configured to supply power for a system, and may be specifically a power management chip. Usually, the communications subsystem 130 is also referred to as a wireless modem (Modem), and mainly implements functions such as baseband processing, modulation/demodulation, and signal amplification, filtering, and balancing. The communications subsystem 130 includes a baseband processor 131, a radio frequency module 132, and an antenna 133. The baseband processor 131 and the application processor 110 may be integrated into a same chip, and exchange a message with each other through memory sharing. In another embodiment, the baseband processor 131 and the application processor 110 may be separately deployed: the baseband processor 131 and the application processor 110 as two independent chips exchange information with each other in an inter-core communication manner. In the separate deployment manner, the baseband processor 131 is equivalent to a peripheral of the application processor 110, the two processors each need an independent power management system, an external storage, and a software upgrade interface.

The radio frequency module 132 is mainly responsible for sending and receiving signals. The baseband processor 131 is responsible for signal processing, for example, A/D conversion and D/A conversion of a signal, signal coding and decoding, or channel coding and decoding. In one embodiment, the radio frequency module 132 includes a radio frequency circuit that implements functions such as radio frequency transmitting and receiving, frequency synthesis, and power amplification. The radio frequency circuit may be packaged in a radio frequency chip. In another embodiment, some or all radio frequency circuits included in the radio frequency module 132 may be integrated with the baseband processor 131 into a baseband chip.

The storage 120 usually includes a memory and an external storage. The memory may be a random access memory (RAM), a read only memory (ROM), a cache (CACHE), or the like. The external storage may be a hard disk, an optical disk, a USB, a floppy disk, a tape drive, or the like. The executable program is usually stored in the external storage, and the application processor 110 loads the executable program from the external storage to the memory, and then executes the program.

In one embodiment, the terminal 10 receives a signal by using the antenna 133, and the radio frequency module 132 and the baseband processor 131 convert the signal into one or more data packets through a series of processing such as filtering, decoding, and conversion. Further, the application processor 110 runs the protocol stack program that is in the storage 120, to further process the one or more data packets, and after being processed by the protocol stack program, the data packet is finally submitted to the application. The protocol stack program is specifically used to execute the operation processes of the manager, the dispatcher, the protocol stack instance, and the coordinator described in the embodiments relating to FIG. 4 to FIG. 13. For related details, refer to the foregoing embodiments.

Optionally, the terminal 10 further includes a wireless fidelity (Wi-Fi) module 150. The Wi-Fi module 150 supports the IEEE 802.11 series protocols, and the terminal 10 may be connected to a WLAN by using the Wi-Fi module 150. In one embodiment, the Wi-Fi module 150 may be a Wi-Fi chip, and communicate with the application processor 110 by using a bus; in another embodiment, the Wi-Fi module 150 may be integrated into the communications subsystem 130, for example, integrated into the baseband processor 131. Similarly, the terminal 10 may also receive a signal by using the Wi-Fi module 150, and the Wi-Fi module 150 processes the received signal and converts the received signal into one or more data packets. The application processor 110 runs the protocol stack program that is in the storage 120, to further process the one or more data packets, and after being processed by the protocol stack program, the data packet is finally submitted to the application.

Optionally, the terminal 10 further includes a display 160, configured to display information entered by a user or information provided for the user, various menu interfaces of the terminal 10, and the like. The display 160 may be a liquid crystal display (LED), an organic light-emitting diode (OLED), or the like. In some other embodiments, the display 160 may be covered with a touch panel, so as to form a touch display.

In addition, the terminal 10 may further include a camera 180 configured to shoot a photo or a video and one or more sensors 170 such as a gravity sensor, an acceleration sensor, or an optical sensor.

In addition, a person skilled in the art may understand that the terminal 10 may include components more or less than those shown in FIG. 14. The terminal 10 shown in FIG. 14 merely shows components more related to a plurality of implementations disclosed in the embodiments of the present invention.

The protocol stack described in the foregoing embodiments of the present invention may be further applied to a network device such as a router or a switch. As an intermediate device for data transmission, after receiving a data packet, the network device may perform high-efficiency data processing by using a heterogeneous protocol stack instance provided by the protocol stack, and then forwards the data packet to a next-hop network device. For specific implementation details of components of the protocol stack, refer to the description in the foregoing embodiments. Details are not repeatedly described herein.

Figure 15:
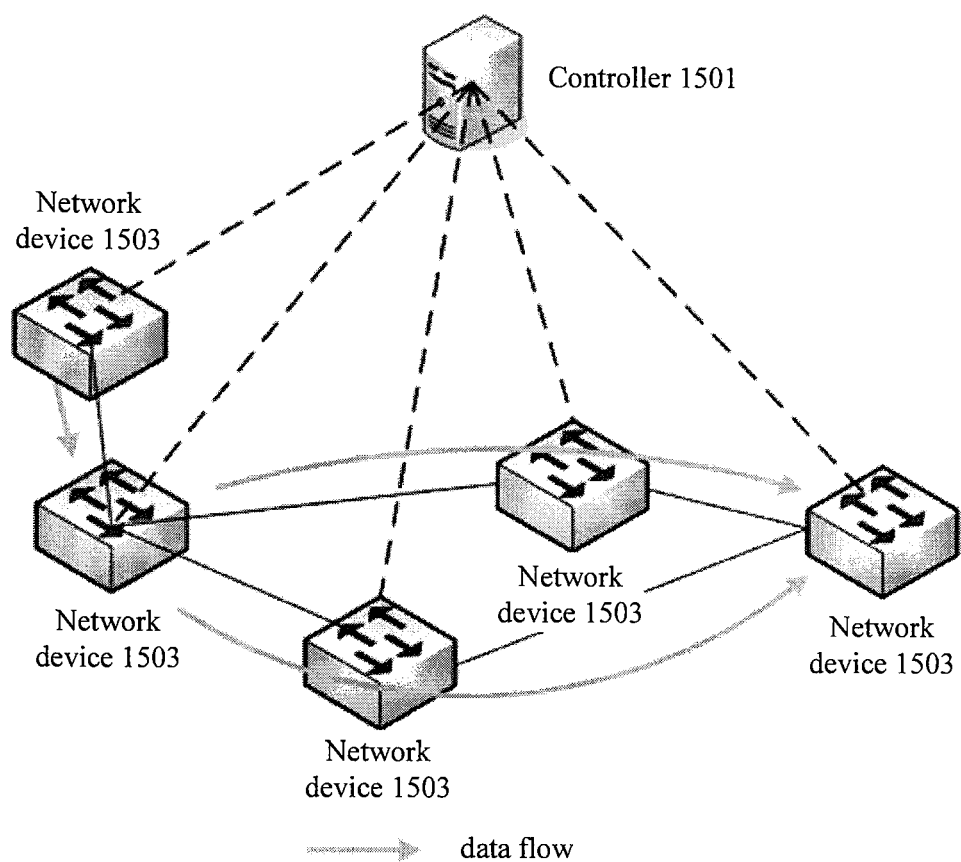
FIG. 15 is a schematic diagram of a communications network according to an embodiment of the present invention.

An embodiment of the present invention further provides a communications network. As shown in FIG. 15, the communications network includes a controller 1501 and a plurality of network devices 1503. The network device 1503 is a router or a switch, and the controller 1501 stores a topology structure of an entire network, generates a flow table for a data flow that needs to be forwarded, and delivers the flow table to the network device 1503. The network device 1503 stores information about the flow table delivered by the controller, and forwards data based on the information about the flow table.

In one embodiment, the network device 1503 is an independent physical device, including a processor, a storage, and the protocol stack described in the embodiments relating to FIG. 4 to FIG. 13. It should be noted that a switch operates on a second layer (data link layer) of an OSI open system structure, but a router operates on a third layer (network layer) of the OSI; therefore, a protocol suite supported by the switch and the router are entirely different from that supported by a server 20. Because the switch is an L2 device, the switch does not need to perform L3 or higher protocol processing on a data packet; therefore, a protocol stack supported by the switch may not include an L3 or higher protocol processing module. A router does not need to perform L4 or higher protocol processing on a data packet; therefore, a protocol stack supported by the router may not include an L4 or higher protocol processing module.

Figure 16:
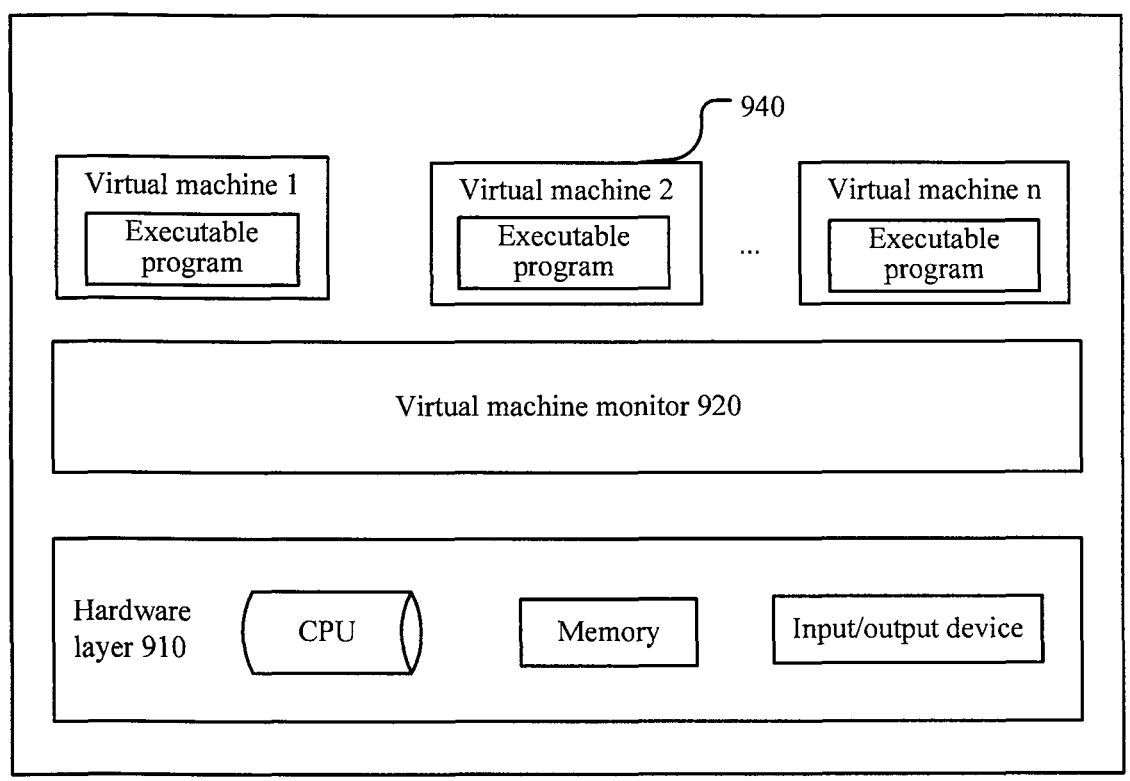
FIG. 16 is a schematic diagram of a virtualization application scenario according to an embodiment of the present invention.

In one embodiment, the network device 1503 and the controller 1501 may be virtual functional units such as a virtual network function (VNF) or a container constructed on a commodity hardware resource by using a virtualization technology. As shown in FIG. 16, a hardware resource provided with a plurality of physical hosts forms a hardware layer 910 (also referred to as an infrastructure layer), a virtual machine monitor (VMM) 920 and several virtual machines (VMs) run on the hardware layer 910, and each virtual machine may be considered as an independent computer and may invoke a resource of the hardware layer to implement a specific function. The hardware layer includes but is not limited to an I/O device, a CPU, and a memory. The network device 1503 may be specifically a virtual machine such as a VM 940. An executable program further runs on the VM 940, and the VM 940 runs the executable program by invoking the resources such as the CPU or the memory that is on the hardware layer 910, so as to implement the functions of the protocol stack described in the embodiments relating to FIG. 4 to FIG. 13. Similarly, the controller 1501 may alternatively be a virtual machine, configured to implement the function of the controller described in the foregoing embodiments.

In the communications network shown in FIG. 15, a function of a coordinator of a protocol stack of the network device 1503 may be integrated into the controller 1501, and the controller 1501 performs resource configuration and dynamical resource adjustment for a protocol stack instance on the network devices based on a status of the entire network. In a process of creating protocol stack instances, the controller 1501 calculates quotas of various types of resources of different types of protocol stack instances based on resource weights of the protocol stack instances, and delivers the quotas to the network device 1503. A manager included in the protocol stack of the network device 1503 implements resource configuration of the protocol stack instances. In a process of dynamically coordinating the resources, the controller 1501 calculates quota increasing or decreasing quantities of different types of system resources of the protocol stack instances on the network device 1503 based on the status of the entire network, for example, loading statuses of the network devices or utilization of various types of resources, to coordinate different types of resources to optimize resource utilization of the entire network and user experience.

A person skilled in the art should be aware that, in the foregoing one or more examples, protocol stack functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, improvement, or the like made based on the technical solutions of the present invention shall fall within the protection scope of the present invention.

What is claimed is:

1. A server, comprising:
    a manager configured to allocate resources to a first protocol stack instance and a second protocol stack instance, wherein a resource configuration of the first protocol stack instance is different from that of the second protocol stack instance, and wherein the resource configuration indicates a type of an allocated resource and a quota of each type of resource; and wherein the first protocol stack instance is configured to process a data packet of a first-type application, and the second protocol stack instance is configured to process a data packet of a second-type application, wherein the first protocol stack instance and the second protocol stack instance are a part of a protocol stack of the server, and the first-type application and the second-type application are upper-layer applications of the protocol stack; and
    a dispatcher configured to: receive a data packet, determine, based on characteristic information of the data packet, a protocol stack instance that matches the data packet, and dispatch the data packet to the matched protocol stack instance, wherein the matched protocol stack instance is the first protocol stack instance or the second protocol stack instance;
    wherein the resource configuration of the first protocol stack instance meets a quality of service (QoS) requirement of the first-type application, and the resource configuration of the second protocol stack instance meets a QoS requirement of the second-type application; and
    the dispatcher is further configured to: dispatch the data packet to the first protocol stack instance when it is determined, based on the characteristic information of the data packet, that the data packet belongs to the first-type application, or dispatch the data packet to the second protocol stack instance when it is determined that the data packet belongs to the second-type application.

2. The server of claim 1, wherein the server further comprises a rule repository, the rule repository stores a dispatching rule indicating a dispatching policy of the data packet; and
    the dispatcher is configured to determine, based on the characteristic information of the data packet and the dispatching rule in the rule repository, the protocol stack instance that matches the data packet.

3. The server of claim 1, wherein the resource type comprises a socket resource, a data buffer resource, and a central processing unit (CPU) resource.

4. The server of claim 1, wherein the first-type application is a high-concurrency application and the second-type application is a high-throughput application; and a socket resource quota of the first protocol stack instance is greater than a socket resource quota of the second protocol stack instance.

5. The server of claim 1, wherein the manager is configured to:
    calculate a quota of each type of resource of the first protocol stack instance and that of the second protocol stack instance based on resource weights of the first protocol stack instance and resource weights of the second protocol stack instance and a total quantity of available resources; and
    allocate, based on the calculated resource quotas, a corresponding quantity of socket resources, data buffer resources, and CPU resources to each of the first protocol stack instance and the second protocol stack instance, wherein a quota of a socket resource allocated to the first protocol stack instance is $M_x$, a quota of a data buffer resource is $N_x$, and a quota of a CPU resource is $L_x$; a quota of a socket resource allocated by the manager to the second protocol stack instance is $M_y$, a quota of a data buffer resource is $N_y$, and a quota of a CPU resource is $L_y$; and the resource configurations of the first protocol stack instance and the second protocol stack instance meet at least one of the following conditions: $M_x \neq M_y$, $N_x \neq N_y$, or $L_x \neq L_y$.

6. The server of claim 1, further comprising a coordinator configured to: dynamically adjust the resource configurations of the first protocol stack instance and the second protocol stack instance based on resource utilization and/or load statuses of the first protocol stack instance and the second protocol stack instance.

7. The server of claim 1, wherein the characteristic information comprises one or more of a source internet protocol (IP) address, a source port, a destination IP address, a destination port, a uniform resource locator (URL), or a protocol name.

8. The server according to claim 1, wherein the first-type application and the second-type application each belong to one of a high-concurrency application, a high-throughput application, and a low-delay application, and the first-type application and the second-type application are different types of applications.

9. A terminal, comprising:
    a storage that stores a protocol stack program, a first application, and a second application, wherein an application type of the first application is different from that of the second application;
    a communications subsystem configured to receive a first data packet; and
    an application processor that executes the protocol stack program to:
        create a first protocol stack instance and a second protocol stack instance, wherein the first protocol stack instance and the second protocol stack instance are a part of a protocol stack of the terminal, and the first-type application and the second-type application are upper-layer applications of the protocol stack,
        allocate resources to the first protocol stack instance and the second protocol stack instance, wherein a resource configuration of the first protocol stack instance is different from that of the second protocol stack instance, and wherein the resource configuration indicates a type of an allocated resource and a quota of each type of resource,
        determine, based on characteristic information of the data packet, a protocol stack instance that matches the data packet, and dispatch the data packet to the matched protocol stack instance, wherein the matched protocol stack instance is the first protocol stack instance or the second protocol stack instance;

wherein the resource configuration of the first protocol stack instance meets a quality of service (QoS) requirement of the first application, and the resource configuration of the second protocol stack instance meets a QoS requirement of the second application, further comprising the application processor to execute the protocol stack program to:
determine, based on the characteristic information of the data packet, that the data packet belongs to the first application, and dispatch the data packet to the first protocol stack instance.

10. The terminal of claim 9, wherein the storage further stores a dispatching rule indicating a dispatching policy of the data packet, further comprising:
the application processor to execute the protocol stack program to: determine, based on the characteristic information of the data packet and the dispatching rule in a rule repository, the protocol stack instance that matches the data packet.

11. The terminal of claim 9, wherein the application processor is further configured to:
dynamically adjust the resource configurations of the first protocol stack and the second protocol stack based on resource utilization and/or load statuses of the first protocol stack instance and the second protocol stack instance.

12. The terminal of claim 9, wherein the type of resource comprises a socket resource, a data buffer resource, and a central processing unit (CPU) resource.

13. The terminal of claim 9, wherein an application type comprises a high-concurrency application, a high-throughput application, and a low-delay application.

14. The terminal of claim 13, wherein the first application is a high-concurrency application and the second application is a high-throughput application; and a socket resource quota of the first protocol stack instance is greater than a socket resource quota of the second protocol stack instance.

15. A data processing method, comprising:
creating a first protocol stack instance and a second protocol stack instance;
allocating resources to the first protocol stack instance and the second protocol stack instance, wherein a resource configuration of the first protocol stack instance is different from that of the second protocol stack instance, and wherein the resource configuration indicates a type of an allocated resource and a quota of each type of resource; and wherein the first protocol stack instance is configured to process a data packet of a first-type application, and the second protocol stack instance is configured to process a data packet of a second-type application;
determining, based on characteristic information of a data packet, a protocol stack instance that matches the data packet, wherein the first protocol stack instance and the second protocol stack instance are a part of a protocol stack, and the first-type application and the second-type application are upper-layer applications of the protocol stack, and
dispatching the data packet to the matched protocol stack instance, wherein the matched protocol stack instance is the first protocol stack instance or the second protocol stack instance;
wherein the resource configuration of the first protocol stack instance meets a quality of service (QoS) requirement of the first application, and the resource configuration of the second protocol stack instance meets a QoS requirement of the second application, further comprising:
determining, based on the characteristic information of the data packet, that the data packet belongs to the first application, and dispatching the data packet to the first protocol stack instance.

16. The method of claim 15, wherein the determining, based on characteristic information of the data packet, the protocol stack instance that matches the data packet comprises:
determining, based on the characteristic information of the data packet and a dispatching rule configured in a rule repository, the protocol stack instance that matches the data packet.

17. The method of claim 15, wherein the allocating resources to the first protocol stack instance and the second protocol stack instance comprises:
calculating a quota of each type of resource of the first protocol stack instance and that of the second protocol stack instance based on a weight of each type of resource of the first protocol stack instance and the second protocol stack instance and a total quantity of available resources; and
allocating, based on the calculated resource quotas, a corresponding quantity of socket resources, data buffer resources, and central processing unit (CPU) resources to each of the first protocol stack instance and the second protocol stack instance, wherein a quota of a socket resource allocated to the first protocol stack instance is $M_x$, a quota of a data buffer resource is $N_x$, and a quota of a CPU resource is $L_x$; a quota of a socket resource allocated to the second protocol stack instance is $M_y$, a quota of a data buffer resource is $N_y$, and a quota of a CPU resource is $L_y$; and the resource configurations of the first protocol stack instance and the second protocol stack instance meet at least one of the following conditions: $M_x \neq M_y$, $N_x \neq N_y$, or $L_x \neq L_y$.

18. The method of claim 15, further comprising:
dynamically adjusting the resource configurations of the first protocol stack instance and the second protocol stack instance based on resource utilization and/or load statuses of the first protocol stack instance and the second protocol stack instance.

* * * * *